United States Patent
Komatsubara et al.

(10) Patent No.: US 11,370,275 B2
(45) Date of Patent: Jun. 28, 2022

(54) FLUID DISCHARGE DEVICE

(71) Applicant: DENSO CORPORATION, Kariya (JP)

(72) Inventors: Yusuke Komatsubara, Kariya (JP); Hitoshi Ninomiya, Kariya (JP); Takahito Nakamura, Kariya (JP); Jun Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/089,224

(22) Filed: Nov. 4, 2020

(65) Prior Publication Data

US 2021/0046805 A1 Feb. 18, 2021

Related U.S. Application Data

(63) Continuation of application No. PCT/JP2019/016667, filed on Apr. 18, 2019.

(30) Foreign Application Priority Data

May 11, 2018 (JP) .............................. JP2018-092157

(51) Int. Cl.
*B60H 1/34* (2006.01)
*F24F 13/065* (2006.01)

(52) U.S. Cl.
CPC ......... *B60H 1/3457* (2013.01); *B60H 1/3435* (2013.01); *F24F 13/065* (2013.01)

(58) Field of Classification Search
CPC .... B60H 1/3457; B60H 1/345; B60H 1/3435; F24F 13/065; F04D 29/66
USPC ................................................ 454/115, 162
See application file for complete search history.

(56) References Cited

U.S. PATENT DOCUMENTS

| 3,802,328 A * | 4/1974 | Kakizaki | B60H 1/3442 454/154 |
|---|---|---|---|
| 2006/0079174 A1* | 4/2006 | Dippel | B60H 1/3407 454/367 |
| 2015/0202946 A1* | 7/2015 | Inagaki | B60H 1/3442 454/154 |
| 2021/0016634 A1 | 1/2021 | Yamaoka et al. | |

(Continued)

FOREIGN PATENT DOCUMENTS

| DE | 10046721 A1 | 4/2002 |
|---|---|---|
| DE | 102008002958 B3 | 10/2009 |

(Continued)

*Primary Examiner* — Jessica Yuen
(74) *Attorney, Agent, or Firm* — Harness, Dickey & Pierce, P.L.C.

(57) ABSTRACT

A fluid discharge device includes a base portion defining a fluid flow passage and having an opening at a downstream end of the fluid flow passage, and a grill portion disposed to adjust a flow direction of the fluid blown from the opening. The grill portion includes a flow passage forming body defining a main flow passage and an auxiliary flow passage. In the flow passage forming body, the auxiliary flow passage surrounds the main flow passage and the auxiliary flow discharged from the auxiliary flow passage flows outside of the main flow discharged from the main flow passage. The flow passage forming body is configured such that a direction of the auxiliary flow discharged from the auxiliary flow passage corresponds to the direction of the main flow discharged from the main flow passage, when the flow direction of the fluid blown out of the opening is adjusted.

13 Claims, 11 Drawing Sheets

(56) References Cited

U.S. PATENT DOCUMENTS

2021/0016635 A1 1/2021 Yamaoka et al.
2021/0031596 A1 2/2021 Yamaoka et al.

FOREIGN PATENT DOCUMENTS

| DE | 102012006339 A1 | 11/2012 |
| DE | 112019001888 T5 | 12/2020 |
| JP | S60256747 A | 12/1985 |
| JP | H07247167 A | 9/1995 |
| JP | H1068548 A | 3/1998 |
| JP | 3432583 B2 | 8/2003 |
| JP | 2010064608 A | 3/2010 |
| JP | 2014088115 A | 5/2014 |
| JP | 2019200038 A | 11/2019 |

* cited by examiner

FLUID DISCHARGE DEVICE

CROSS REFERENCE TO RELATED APPLICATION

The present application is a continuation application of International Patent Application No. PCT/JP2019/016667 filed on Apr. 18, 2019, which designated the U.S. and claims the benefit of priority from Japanese Patent Application No. 2018-092157 filed on May 11, 2018. The entire disclosures of all of the above applications are incorporated herein by reference.

TECHNICAL FIELD

The present disclosure relates to a fluid discharge device that discharges a fluid.

BACKGROUND

Conventionally, a known register for automobiles includes a louver for adjusting left and right wind directions and a barrel made of a plurality of fins, and two side surfaces of the barrel are provided with pins rotatably inserted into pin holes provided in a blower case. In this automobile register, an up-down wind direction can be adjusted by rotating the entire barrel upwardly and downwardly.

SUMMARY

According to an aspect of the present disclosure, a fluid discharge device includes a base portion defining a fluid flow passage and having an opening at a downstream end of the fluid flow passage, and a grill portion disposed in the fluid flow passage to adjust a flow direction of the fluid blown from the opening.

The grill portion includes a flow passage forming body defining a main flow passage that guides a part of the fluid flowing through the fluid flow passage to the opening as a main flow, and an auxiliary flow passage that guides the rest part of the fluid flowing through the fluid flow passage to the opening as an auxiliary flow.

In the flow passage forming body, the auxiliary flow passage surrounds the main flow passage, and the auxiliary flow discharged from the auxiliary flow passage flows outside of the main flow discharged from the main flow passage. Furthermore, a direction of the auxiliary flow discharged from the auxiliary flow passage corresponds to the direction of the main flow discharged from the main flow passage, when the flow direction of the fluid blown out of the opening is adjusted.

In this way, because the auxiliary flow discharged from the auxiliary flow passage flows outside of the main flow discharged from the main flow passage, a development of a lateral vortex formed in the main flow can be suppressed by the auxiliary flow, and thereby restricting a diffusion of the main flow or/and an external fluid outside the device from being drawn into the main flow.

BRIEF DESCRIPTION OF THE DRAWINGS

The above and other objects, features and advantages of the present disclosure will become more apparent from the following detailed description made with reference to the accompanying drawings.

DESCRIPTION OF EMBODIMENT

Figure 1:
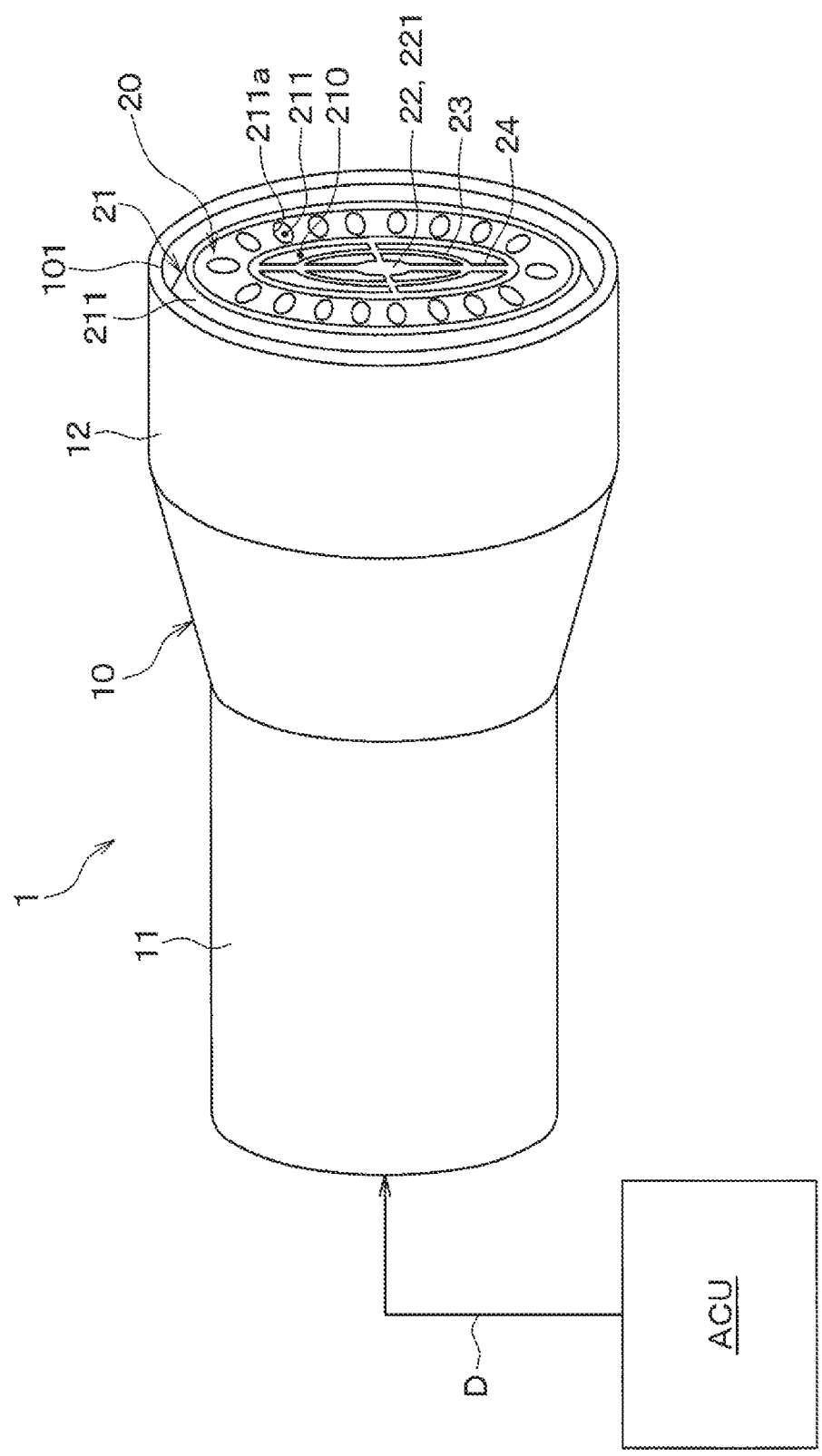
FIG. 1 is a schematic perspective view of a fluid discharge device according to a first embodiment.

In an air discharge device of an automobile register, it may be desirable to increase a reaching distance of an airflow so as to give an air-conditioning feeling not only to the front seat area but also to the rear seat area of a vehicle. However, in the case of having the function of adjusting the direction of the airflow, the reaching distance of the airflow discharged at the time of adjusting the direction of the airflow tends to be short. Such a problem may occur not only in the register for automobiles but also in other fluid discharge devices for discharging a fluid.

The inventors of the present application have deeply studied to increase the reaching distance of the fluid in a fluid discharge device. According to the inventor's studies, when the fluid is discharged from the fluid discharge device, a lateral vortex is generated due to a velocity gradient of the fluid, and thereby the main flow is diffused by the lateral vortex and an external fluid outside the device is blown from the fluid discharge device by the lateral vortex. In this case, the reaching distance of the fluid tends to be shortened.

An object of the present disclosure is to provide a fluid discharge device capable of increasing a reaching distance of a fluid to be discharged even when adjusting a direction of a discharged fluid flow.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The respective embodiments described herein may be partially combined with each other as long as no particular problems are caused even without explicit statement of these combinations.

First Embodiment

The present embodiment will be described with reference to FIGS. 1 to 15. In the present embodiment, an example will be described, in which a fluid discharge device 1 of the present disclosure is applied to an air discharge device of an air conditioning unit ACU that air-conditions a vehicle interior. The air conditioning unit ACU is disposed, for example, inside an instrument panel provided at the foremost portion in a passenger compartment. The air discharge device of the air conditioning unit ACU is installed at the instrument panel or inside of the instrument panel.

Figure 2:
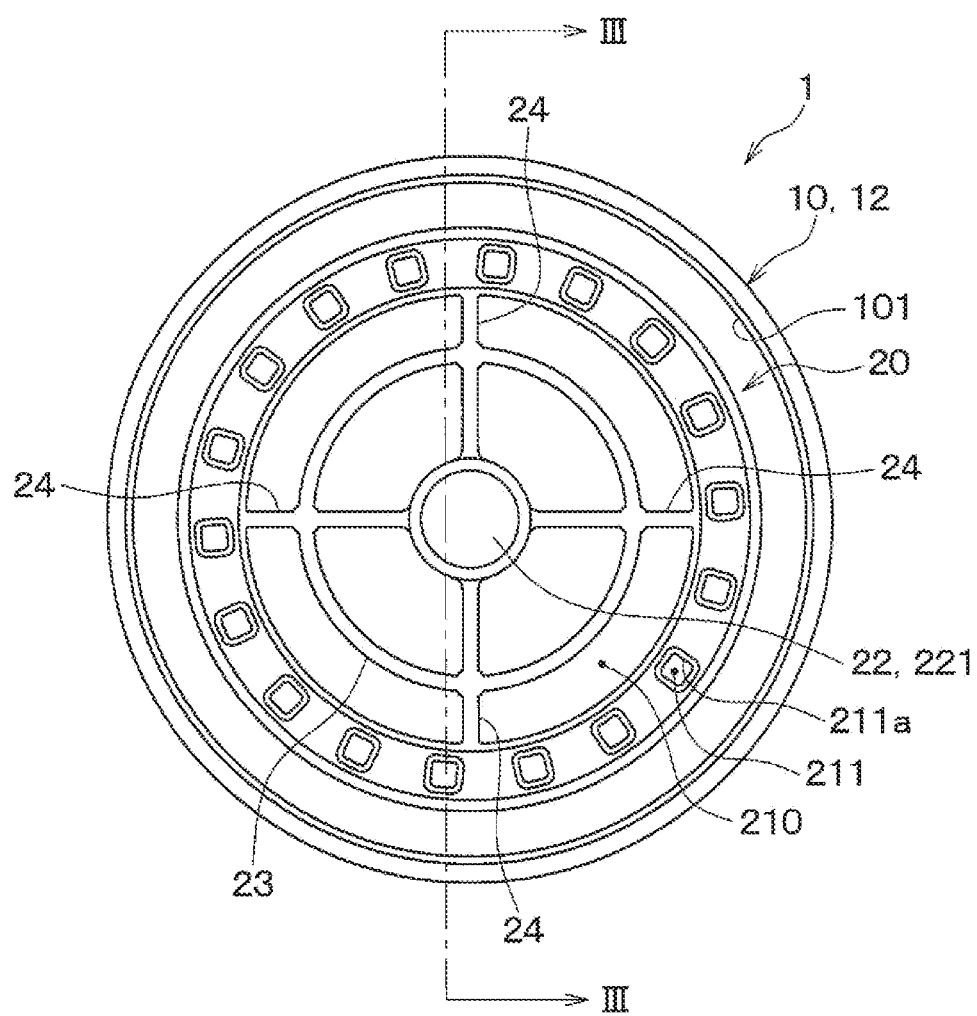
FIG. 2 is a schematic front view of the fluid discharge device according to the first embodiment.
Figure 3:
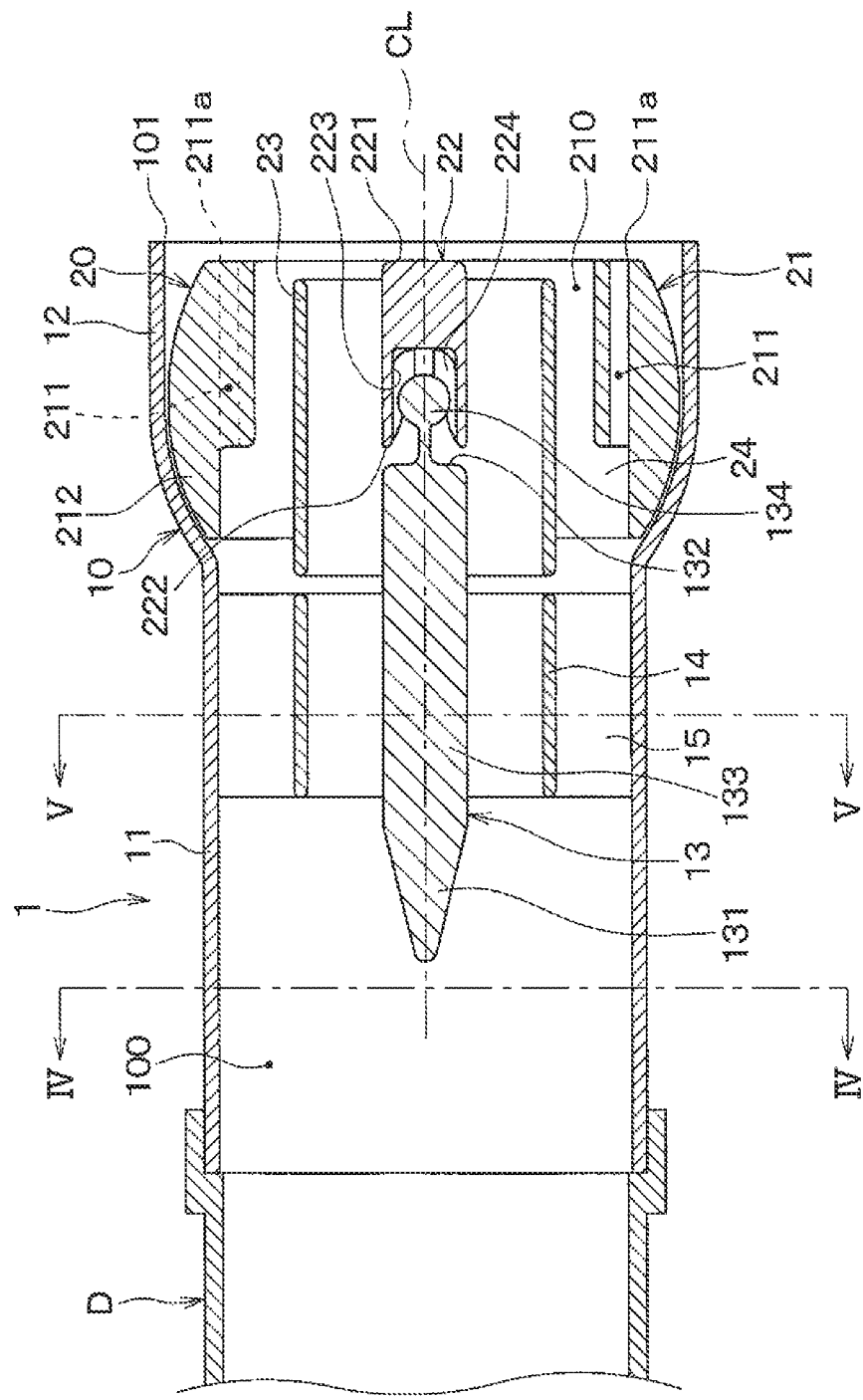
FIG. 3 is a cross-sectional view taken along III-Ill line in FIG. 2.

The fluid discharge device 1 shown in FIGS. 1 and 2 is a device configured to discharge the conditioned air with a temperature adjusted by the air conditioning unit ACU, into the vehicle interior. The fluid discharge device 1 is configured to include a base portion 10 defining an outer shell, and a grill portion 20 that adjusts the direction of the air flow blown into the vehicle interior. As shown in FIG. 3, the base portion 10 is formed of a substantially cylindrical tubular member, and an air-conditioning flow passage 100 is formed therein. The base portion 10 is provided with an opening 101 at a downstream end of the flow passage 100.

The base portion 10 is connected to the air conditioning unit ACU via an air conditioning duct D so that the air having an adjusted temperature or humidity is introduced as a fluid into the flow passage 100 inside of the base portion 10. In the present embodiment, the air conditioning unit ACU is an air conditioner that adjusts the temperature or humidity of the air introduced into the base portion 10.

The base portion 10 includes a connection portion 11 to which the air conditioning duct D is connected, and an accommodation portion 12 that houses the grill portion 20. The connection portion 11 is a portion of the base portion 10 at the upstream side of the air flow, with respect to the accommodation portion 12. The accommodation portion 12 is a portion of the base portion 10, closer to the opening 101, and is connected to the connection portion 11 at the upstream side of the air flow.

The base portion 10 is provided therein with a rod-shaped center cone 13 extending along the air flow direction in the flow passage 100, and a substantially cylindrical base-side tubular portion 14 surrounding a part of the center cone 13. The center cone 13 and the base-side tubular portion 14 are connected to the base portion 10 via a support portion 15 that extends radially from the center cone 13.

The center cone 13 is arranged in the flow passage 100 such that an axis of the center cone 13 is substantially aligned with a center line CL of the flow passage 100 formed inside the base portion 10. The center cone 13 extends along the center line CL of the flow passage 100.

The center cone 13 has a tip portion 131 in an upstream area of the air flow, a downstream end portion 132 in a downstream area of the air flow, and an intermediate portion 133 between the tip portion 131 and the downstream end portion 132. The center cone 13 is arranged in the flow passage 100 so that the tip portion 131 and a part of the intermediate portion 133 are located inside the connection portion 11, and the rest of the intermediate portion 133 and the downstream end portion 132 are located inside the accommodating portion 12.

The diameter of the tip portion 131 is reduced as toward the upstream side of the air flow. That is, the tip portion 131 has a substantially conical shape having an apex on the upstream side of the air flow. The tip portion 131 functions as a dispersion portion for changing the direction of the airflow flowing from the flow passage 100 toward a main flow passage 210 of the grill portion 20 described later, to a side of an auxiliary flow passage 211.

The intermediate portion 133 is a portion that is continuous with the tip portion 131 in the center cone 13, and has a cylindrical shape. The intermediate portion 133 functions as a contraction portion that reduces the passage cross-sectional area of the flow passage 100 at a position downstream of the tip portion 131 in the air flow. The intermediate portion 133 used as the contraction portion will be described below with reference to FIGS. 4 and 5.

Figure 4:
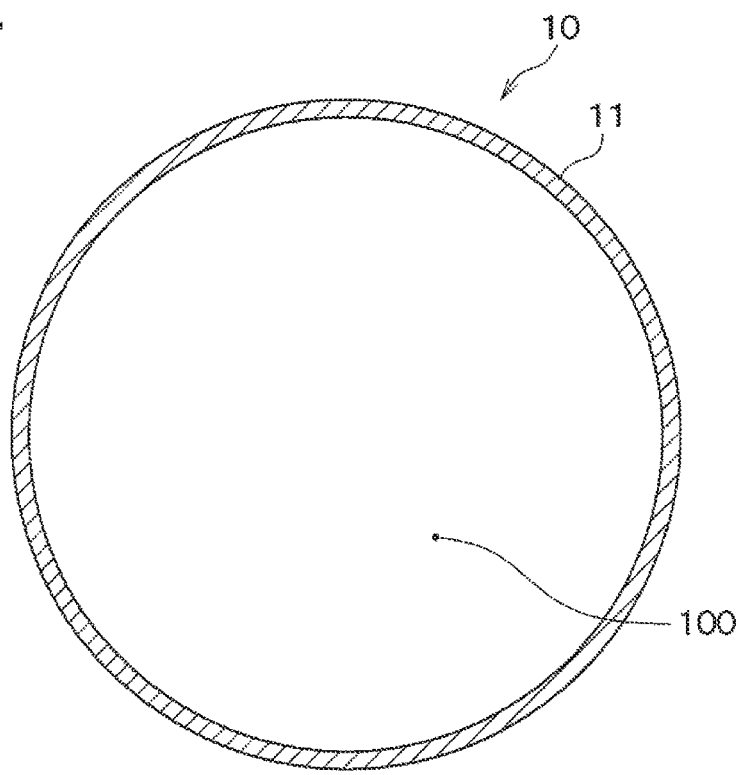
FIG. 4 is a cross-sectional view taken along line IV-IV of FIG. 3.

As shown in FIG. 4, on the air flow upstream side from the center cone 13 in the flow passage 100, since there is no center cone 13 or the like, the cross-sectional shape of the flow passage 100 is an annular shape. In this case, the passage cross-sectional area of the flow passage 100 is the area inside the annular portion of the connection portion 11.

Figure 5:
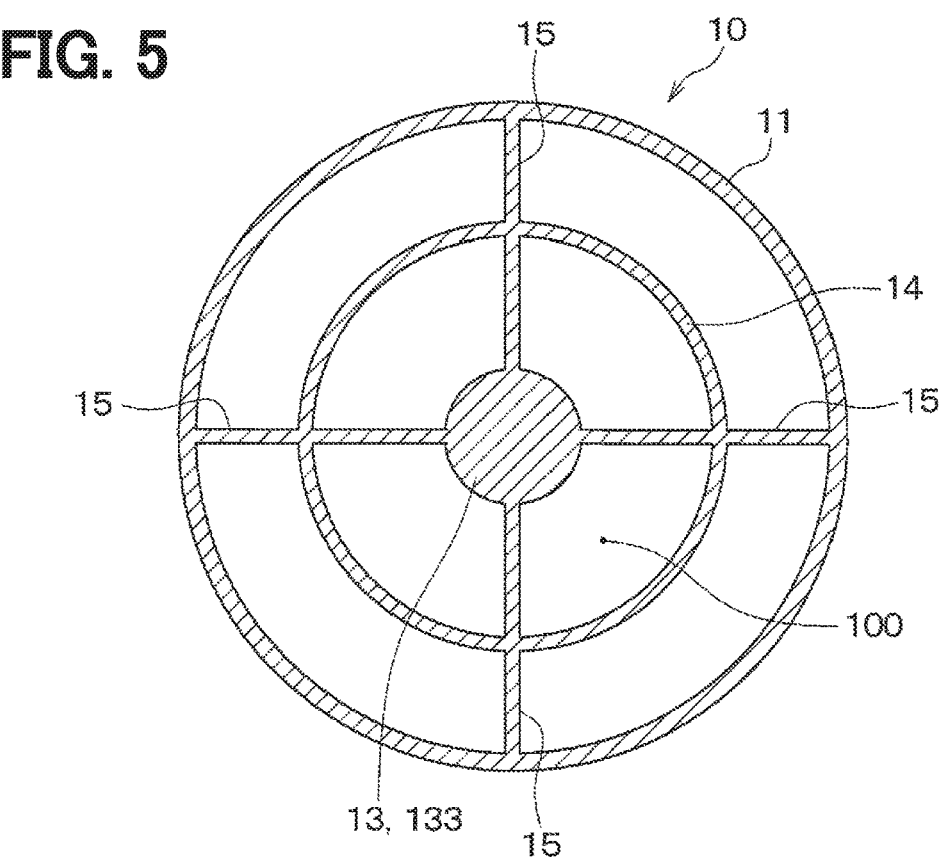
FIG. 5 is a cross-sectional view taken along a line V-V of FIG. 3.

On the other hand, as shown in FIG. 5, in the position where the intermediate portion 133 of the center cone 13 is provided in the flow passage 100, the passage cross-sectional area of the flow passage 100 is a subtracted area subtracting an area occupied by the intermediate portion 133 and the like from the annular portion of the connection portion 11.

In this way, since the intermediate portion 133 is positioned in the flow passage 100 at the air flow downstream side of the tip portion 131, the cross-sectional area of the flow passage 100 is reduced at the air flow downstream side of the tip portion 131 due to the intermediate portion 133 and the like, in the base portion 10.

Returning to FIG. 3, the downstream end portion 132 is a portion that is continuous from the intermediate portion 133 in the center cone 13. The downstream end portion 132 is provided with a spherical ball stud 134. The ball stud 134 is a member that makes a pair with a ball socket 224 provided in the grill portion 20 described later.

The base-side tubular portion 14 has a substantially cylindrical shape surrounding the intermediate portion 133 of the center cone 13. The base-side tubular portion 14 is disposed in the flow passage 100, such that a concentric space is formed between the base-side tubular portion 14 and an inner wall surface of the connection portion 11 of the base portion 10, and between the intermediate portion 133 of the center cone 13 and the base-side tubular portion 14. The base-side tubular portion 14 functions as a base-side rectifier configured to rectify the airflow flowing through the flow passage 100 so that the airflow flowing through the flow passage 100 flows into both the main flow passage 210 and the auxiliary flow passage 211 of the grill portion 20 described later.

The accommodation portion 12 of the base portion 10 is a portion of the base portion 10 in which the grill portion 20 is accommodated. In the accommodation portion 12, a part of an inner wall surface of the accommodation portion 12 has a curved shape so that the grill portion 20 can be rotated in the accommodation portion 12. Specifically, the inner wall surface of the accommodation portion 12 connected to the connection portion 11 has a shape curved in an arc shape.

Next, the grill section 20 will be described. The grill portion 20 is accommodated in the flow passage 100 of the base portion 10 and adjusts the direction of the air flow blown out of the opening 101 of the base portion 10. Specifically, the grill portion 20 is housed in the accommodation portion 12 of the base portion 10.

The grill portion 20 includes a flow passage forming body 21 defining the main flow passage 210 that guides a part of the airflow flowing through the flow passage 100 to the opening 101 as a main flow, and the auxiliary flow passage 211 that guides the rest part of the airflow flowing through the flow passage 100 to the opening 101 as an auxiliary flow.

The flow passage forming body 21 is configured, so that the auxiliary flow passage 211 surrounds the main flow passage 210 and the auxiliary flow discharged from the auxiliary flow passage 211 on the side of the opening 101 flows outside of the main flow discharged from the main flow passage 210.

Specifically, the flow passage forming body 21 is made of a tubular member. The flow passage forming body 21 has an outer wall portion 212 that curves in a circular shape corresponding to the inner wall surface 121 of the accommodation portion 12. The main flow passage 210 is formed inside the outer wall portion 212. Further, the outer wall portion 212 is provided with a plurality of through holes 211a penetrating through the outer wall portion 212 along a direction parallel with the main flow passage 210. The auxiliary flow passage 211 is formed by the through holes 211a.

The grill portion 20 is provided with a rod-shaped column portion 22 inside the flow passage forming body 21, and a substantially cylindrical grill-side tubular portion 23 surrounding the column portion 22. The column portion 22 and the grill-side tubular part 23 are connected to the flow passage forming body 21 via a support portion 24 extending radially from the column portion 22.

The column portion 22 is arranged inside of the flow passage forming body 21 such that the axis of the column portion 22 is substantially aligned with the center line of the main flow passage 210. The column portion 22 has an outer end portion 221 that is a downstream end on a side of the opening 101, and an inner end portion 222 that is an end on an opposite of the outer end portion 221. Further, the column portion 22 is arranged in the main flow passage 210 so that the inner end portion 222 faces the downstream end portion 132 of the center cone 13.

The inner end portion 222 of the column portion 22 has a groove 223 recessed toward the outer end portion 221. A ball socket 224 for receiving the ball stud 134 of the center cone 13 is provided in the groove 223. The ball socket 224 is a support member that supports the outside of the ball stud 134.

The grill portion 20 is rotatably supported with respect to the base portion 10 by fitting the ball studs 134 of the center cone 13 into the ball sockets 224 of the column portion 22. The ball stud 134 and the ball socket 224 constitute a ball joint mechanism that rotatably connects the grill portion 20 to the base portion 10. In the present embodiment, the ball joint mechanism including the ball studs 134 and the ball sockets 224 constitutes a support mechanism that rotatably supports the grill portion 20 with respect to the base portion 10.

The grill-side tubular portion 23 has a substantially cylindrical shape that surrounds the column portion 22. The grill-side tubular portion 23 is provided to rectify the airflow flowing through the main flow path 210. In the present embodiment, the grill-side tubular portion 23 constitutes a grill-side straightening portion that regulates the fluid flowing through the main flow passage 210.

The grill-side tubular portion 23 is positioned downstream of the base-side tubular portion 14 in the air flow direction. The grill-side tubular portion 23 has a cylindrical shape having substantially the same diameter as the base-side tubular portion 14. The grill-side tubular portion 23 is separated from the base-side tubular portion 14 so as not to contact the base-side tubular portion 14 when the grill portion 20 is rotated.

Figure 6:
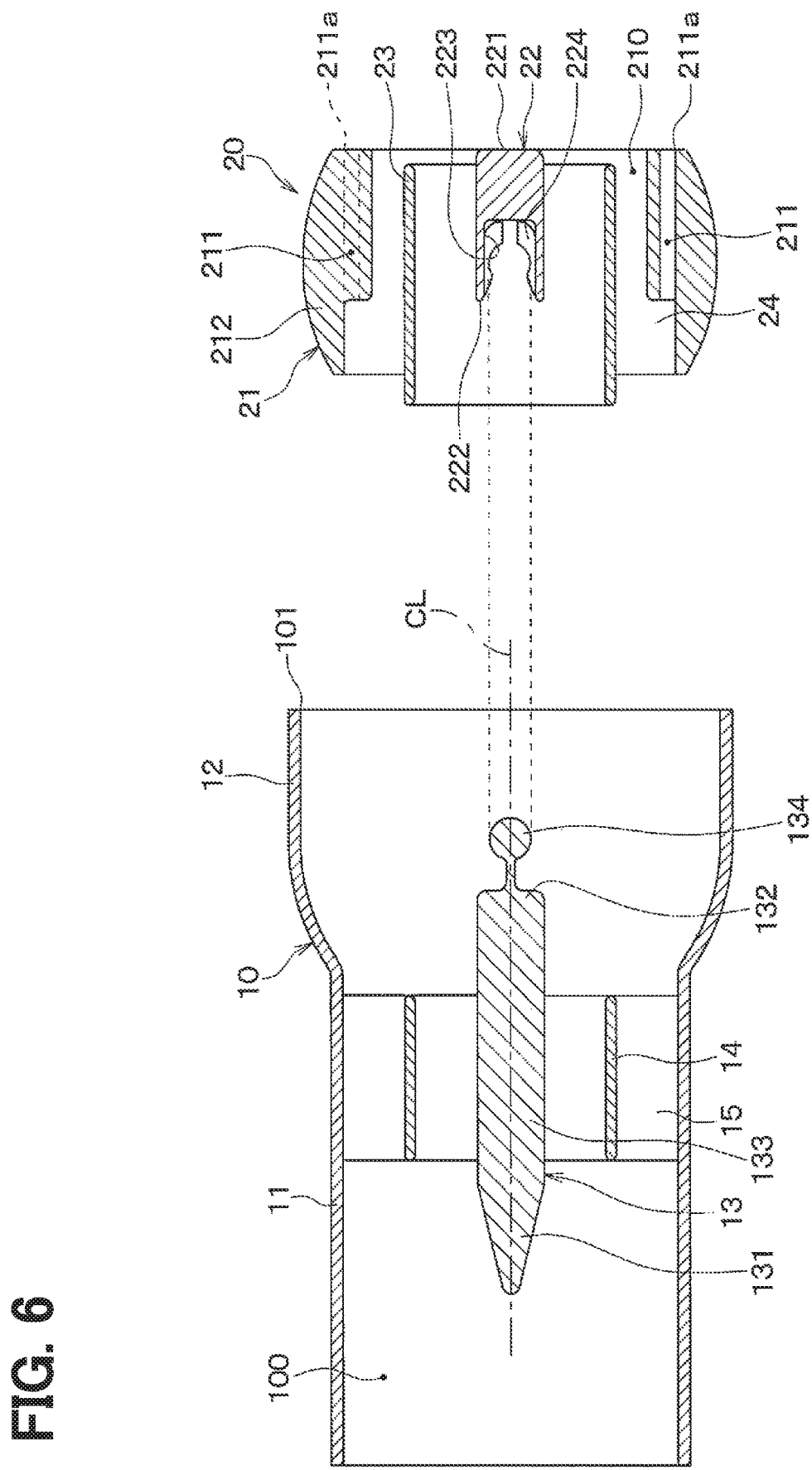
FIG. 6 is a schematic exploded view of the fluid discharge device according to the first embodiment.

In the grill portion 20 with the above configuration, the main flow passage 210 is formed inside the outer wall portion 212 of the flow passage forming body 21, and the auxiliary flow passage 211 is formed by the through holes 211a penetrating through the outer wall portion 212. Further, as shown in FIG. 6, the grill portion 20 is rotatably supported with respect to the base portion 10 by fitting the ball stud 134 of the base portion 10 into the ball socket 224 of the grill portion 20. With such a structure, the grill portion 20 is configured such that the direction of the auxiliary flow discharged from the auxiliary flow passage 211 corresponds to the direction of the main flow discharged from the main flow passage 210, when the direction of the air flow blown out of the opening 101 is adjusted.

Next, the operation of the fluid discharge device 1 will be described with reference to FIGS. 7 to 15. FIGS. 7 to 13 show a state in which the grill portion 20 is set so that the airflow is blown straightly from the opening 101.

Figure 7:
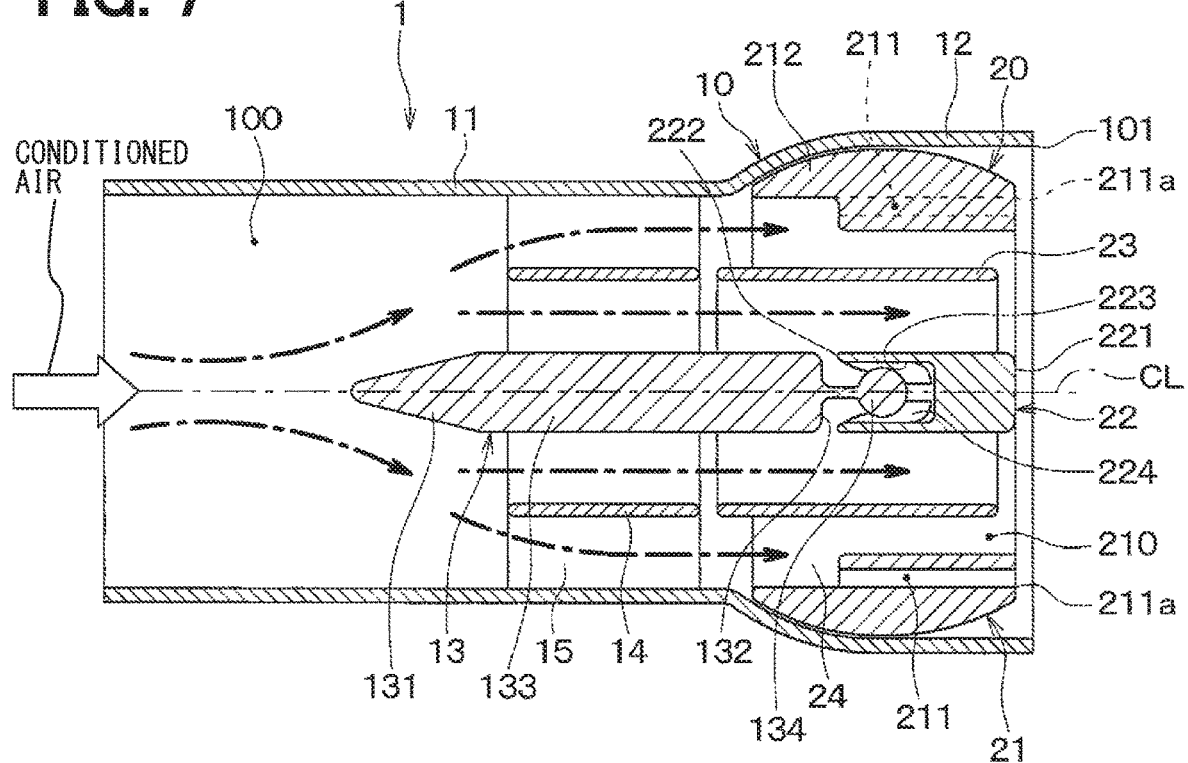
FIG. 7 is a diagram for explaining an air flow inside the fluid discharge device according to the first embodiment.
Figure 8:
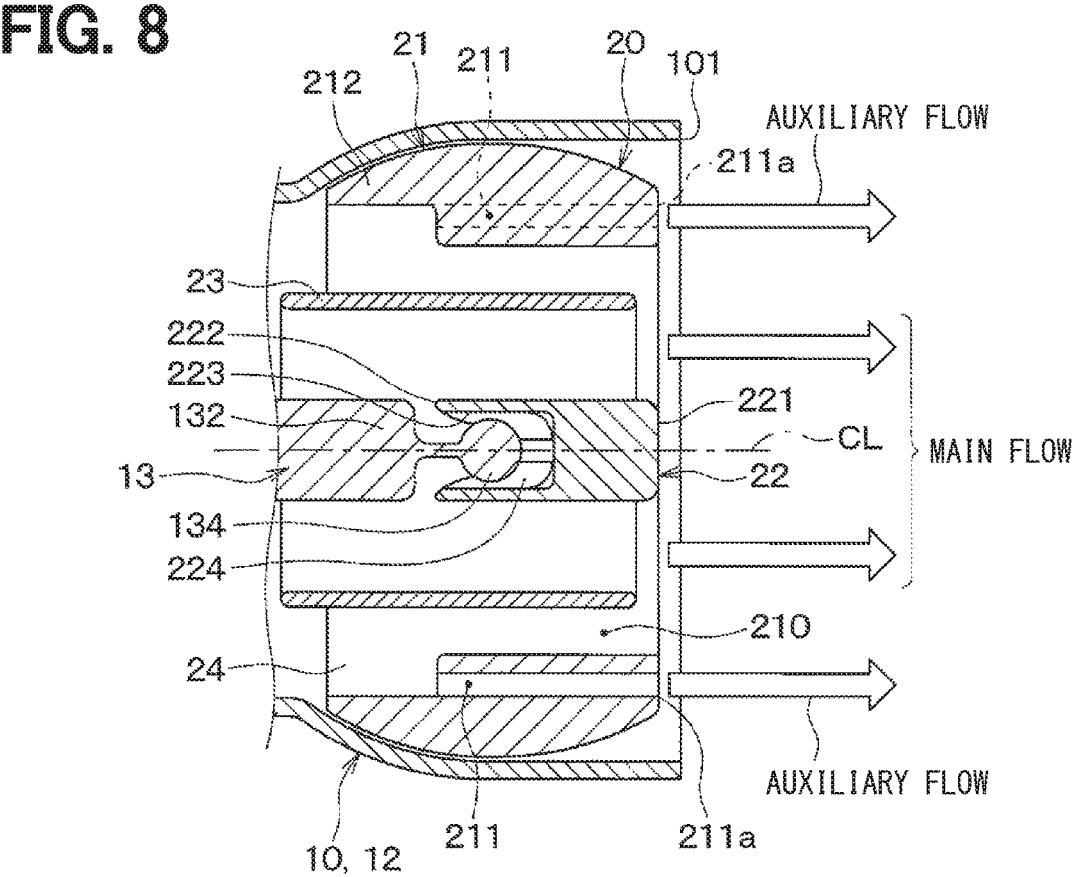
FIG. 8 is a diagram for explaining an airflow blown from a grill portion of the fluid discharge device according to the first embodiment.
Figure 9:
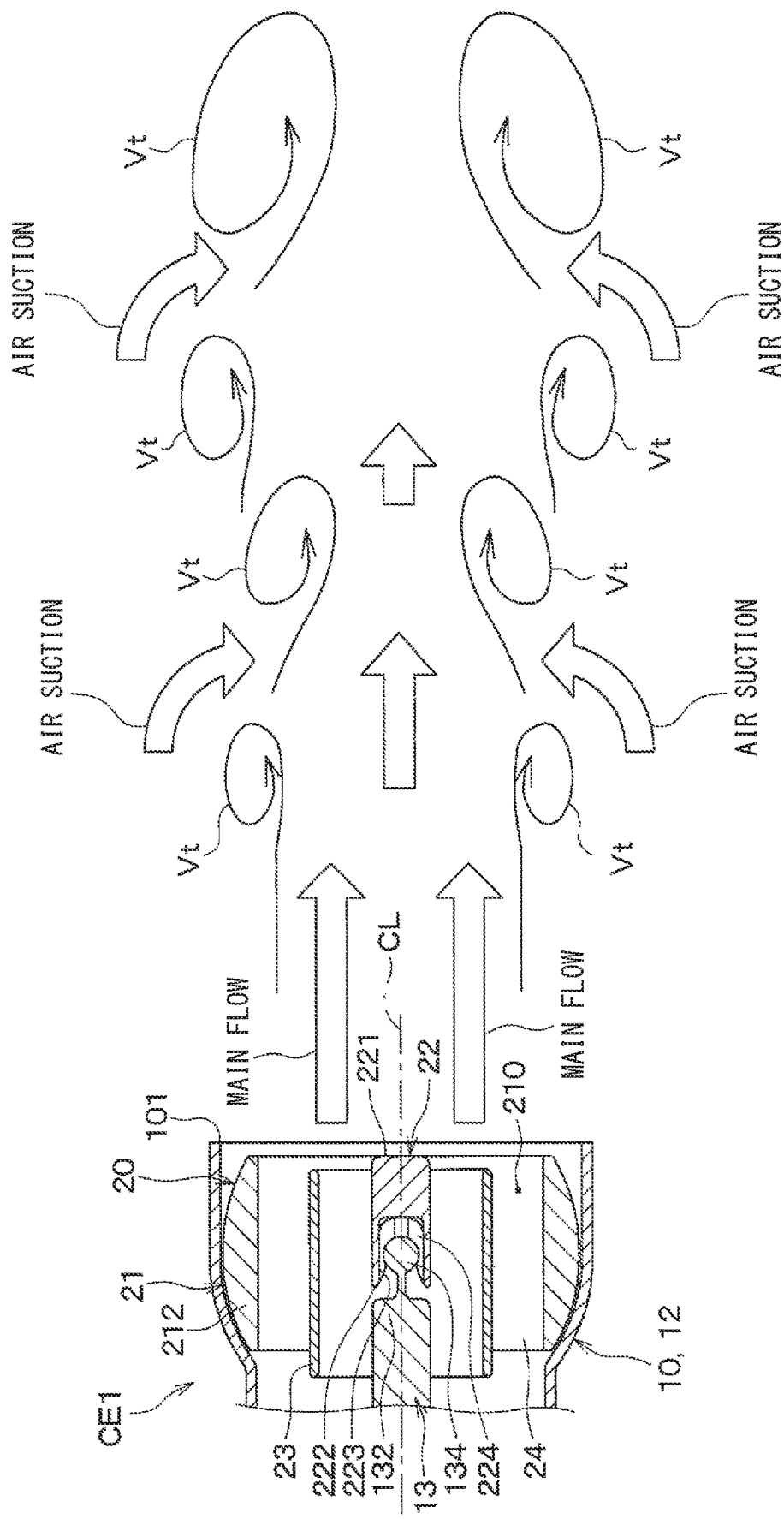
FIG. 9 is a diagram for explaining a state of an airflow blown from a grill portion of a fluid discharge device of a first comparative example, comparative with the first embodiment.

When the air conditioning unit ACU operates, as shown in FIG. 7, the conditioned air with a temperature or humidity adjusted by the air conditioning unit ACU, flows into the fluid discharge device 1 through the air conditioning duct D. The conditioned air flowing into the fluid discharge device 1 flows through the flow passage 100 of the base portion 10, and then a part thereof flows into the main flow passage 210 and the rest part flows into the auxiliary flow passage 211. Then, as shown in FIG. 8, the conditioned air flowing through the main flow passage 210 and the auxiliary flow passage 211 is blown into the vehicle interior. FIG. 9 is a diagram for explaining a state of the airflow blown from a fluid discharge device CE1 of a first comparative example comparative with the first embodiment. The fluid discharge device CE1 as the first comparative example is different from the fluid discharge device 1 of the present embodiment, in that the auxiliary flow passage 211 is not provided for the grill portion 20. In order to facilitate understanding of the description, in the fluid discharge device CE1 of the first comparative example shown in FIG. 9, the same reference numerals as the fluid discharge device 1 of the first embodiment are used for members having the same functions as those of the fluid discharge device 1 of the present embodiment.

As shown in FIG. 9, in the fluid discharge device CE1 of the first comparative example, when the main flow is blown from the main flow passage 210, innumerable lateral vortices Vt are generated due to the velocity difference between the main air flow from the main flow passage 210 and the stationary air around the main air flow at a downstream side of the outlet of the main flow passage 210. The main air flow is diffused by the lateral vortex Vt, and at the same time, the stationary air outside the device (that is, the external fluid) is drawn into the main air flow, so that the reaching distance of the main air flow is shortened in the fluid discharge device CE1. In this case, the lateral vortices Vt are combined with each other, and the lateral vortices Vt may develop into a larger lateral vortex Vt. Further, when air that is stationary outside the device is drawn into the main air flow, the temperature or humidity of the main air flow changes. Therefore, it may be difficult for the conditioned air adjusted to an appropriate temperature or humidity to reach a desired space.

Figure 10:
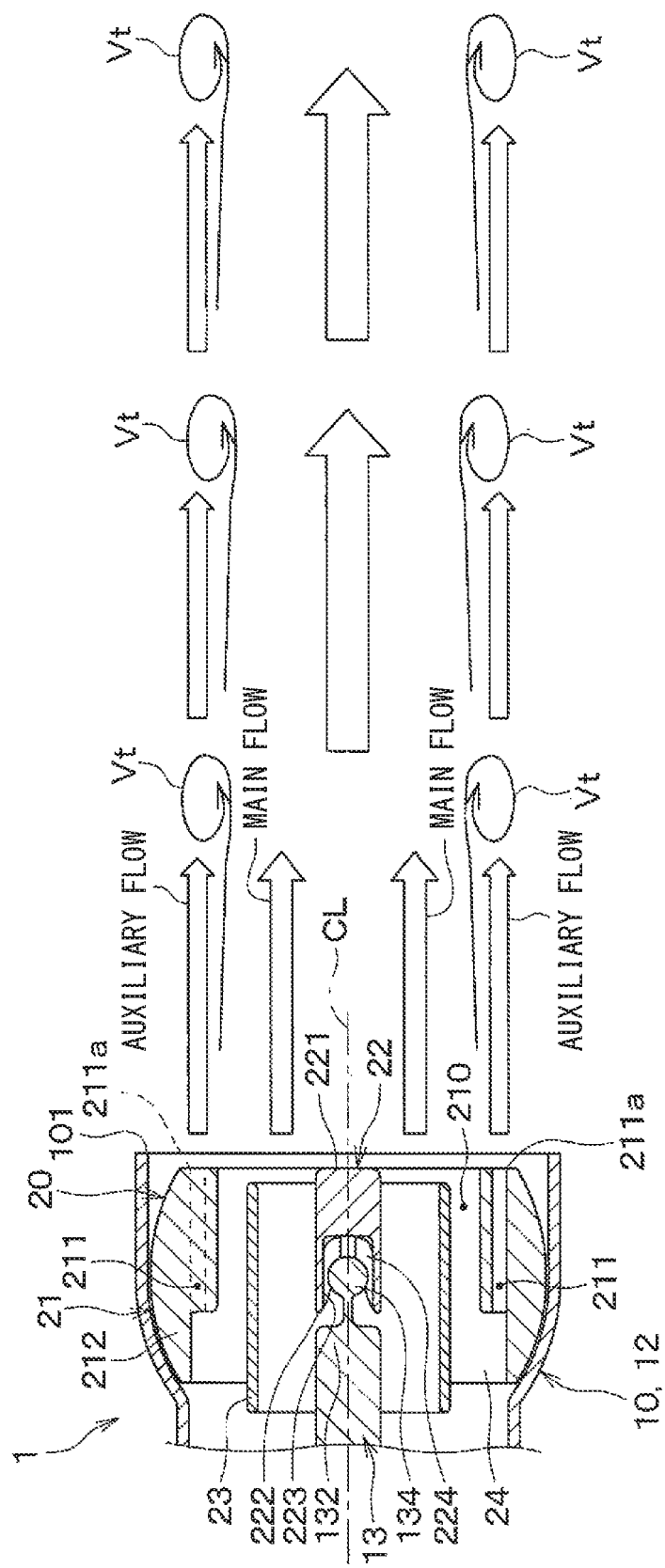
FIG. 10 is a diagram for explaining a state of the airflow blown from the grill portion of the fluid discharge device according to the first embodiment.

In contrast, in the fluid discharge device 1 of the present embodiment, as shown in FIG. 10, the auxiliary air flow blown out from the auxiliary passage 211 flows outside of the main air flow blown out from the main passage 210.

Because of the auxiliary flow, it is possible to suppress the lateral vortex Vt formed in the main flow from being disturbed and to suppress a development of the lateral vortex Vt, thereby restricting the main flow from being diffused and the stationary air outside the device (that is, the external fluid) from being drawn into the main flow. Therefore, the reaching distance of the main flow can be lengthened. Further, if the development of the lateral vortex Vt is suppressed, the air that is stationary outside the device may be difficult to be drawn into the main flow, so that the airflow adjusted to an appropriate temperature or humidity easily reaches the desired space.

Figure 11:
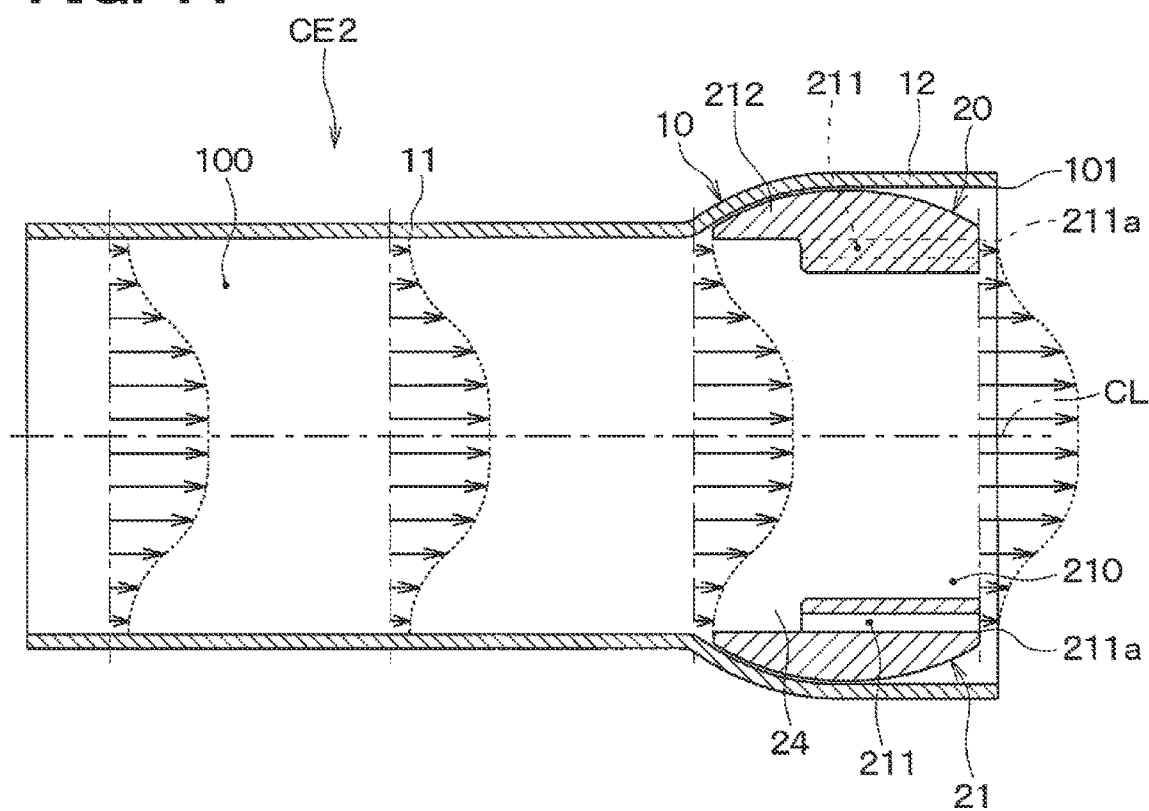
FIG. 11 is a diagram for explaining a state of an airflow inside a fluid discharge device of a second comparative example, comparative with the first embodiment.
Figure 12:
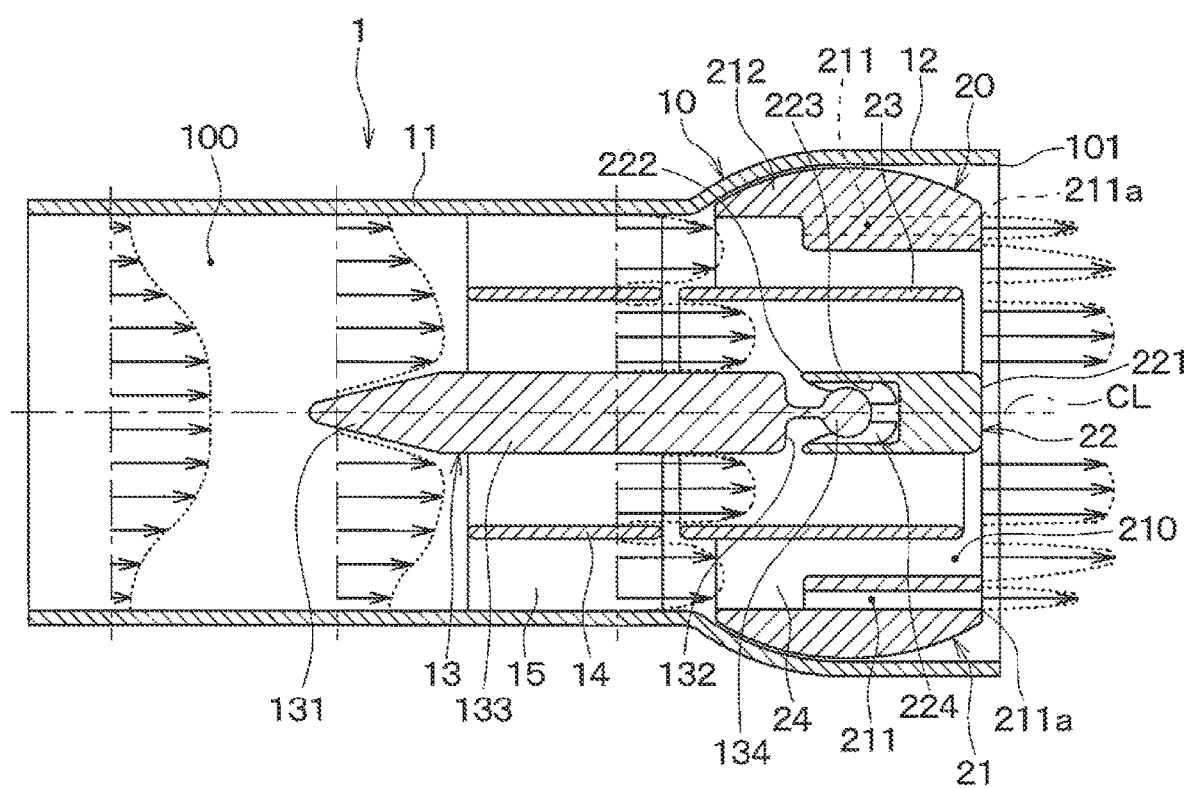
FIG. 12 is a diagram for explaining a state of the airflow inside the fluid discharge device according to the first embodiment.

FIG. 11 is a diagram for explaining a state of an air flow in a fluid discharge device CE2 of a second comparative example comparative with the first embodiment. The fluid discharge device CE2 of the second comparative example is different from the fluid discharge device 1 of the present embodiment, in that the center cone 13 and the base-side tubular portion 14 are not provided in the flow passage 100 of the base portion 10. In order to facilitate understanding of the description, in the fluid discharge device CE2 of the second comparative example shown in FIG. 11, the same reference numerals as the fluid discharge device 1 of the first embodiment are used for members having the same functions as those of the fluid discharge device 1 of the present embodiment.

As shown in FIG. 11, in the fluid discharge device CE2 of the second comparative example, the velocity of the airflow flowing through the flow passage 100 decreases near the inner wall surface 112 of the connection portion 11 of the base portion 10, so that the air flow rate near the inner wall surface 112 is smaller than that in the center area.

When the airflow flows into the grill portion 20 in this distribution state, it becomes difficult for the airflow to flow to the auxiliary flow passage 211 formed outside the main flow passage 210. If the flow rate of the airflow flowing through the auxiliary flow passage 211 is small, it may be difficult to sufficiently obtain the effect of suppressing the diffusion of the main flow due to the auxiliary flow discharged from the auxiliary flow passage 211 and the effect of reducing the suction action of the external fluid.

In contrast, in the fluid discharge device 1 of the present embodiment, the center cone 13 and the base-side tubular portion 14 are provided in the flow passage 100 of the base portion 10. For this reason, in the air flow flowing into the flow passage 100, a flow direction of air flowing in the main flow passage 210 changes to a side of the auxiliary flow passage 211 by the tip portion 131 of the center cone 13. As a result, the velocity of the airflow flowing near the inner wall surface 112 of the connection portion 11 of the base portion 10 increases.

Further, on a downstream side of the tip end portion 131 in the flow passage 100, the flow passage cross-sectional area is reduced by the intermediate portion 133 of the center cone 13. As a result, the flow speed difference between the airflow flowing near the inner wall surface 112 of the connection portion 11 of the base portion 10 and the airflow flowing near the center area of the flow passage 100 is reduced.

Further, the base portion 10 is provided with the base-side tubular portion 14 to rectify the airflow flowing through the flow passage 100 so that the airflow flowing through the flow passage 100 passes through both the main flow passage 210 and the auxiliary flow passage 211. Therefore, the turbulent air flow by the tip portion 131 and the intermediate portion 133 of the center cone 13 is regulated by the base-side tubular portion 14 so as to flow into both the main flow passage 210 and the auxiliary flow passage 211. The regulated flow is maintained by the grill-side tubular portion 23 provided in the grill portion 20, so that the airflow flowing through the flow passage 100 effectively flows not only in the main flow passage 210 but also in the auxiliary flow passage 211.

Figure 13:
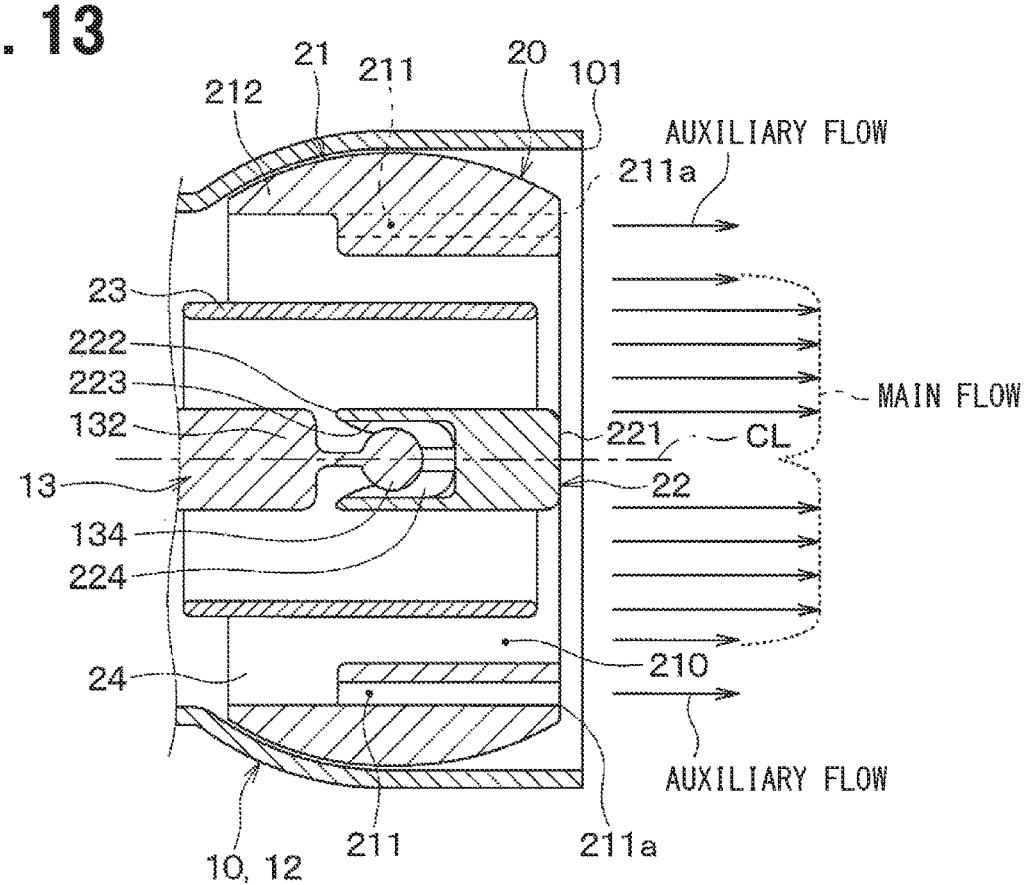
FIG. 13 is a diagram for explaining a wind velocity distribution of a main flow blown from the grill portion of the fluid discharge device according to the first embodiment.

As a result, the fluid discharge device 1 of the present embodiment can discharge not only the main flow from the main flow passage 210 but also the auxiliary flow having a sufficient velocity and flow rate from the auxiliary flow passage 211, as shown in FIG. 13.

Figure 14:
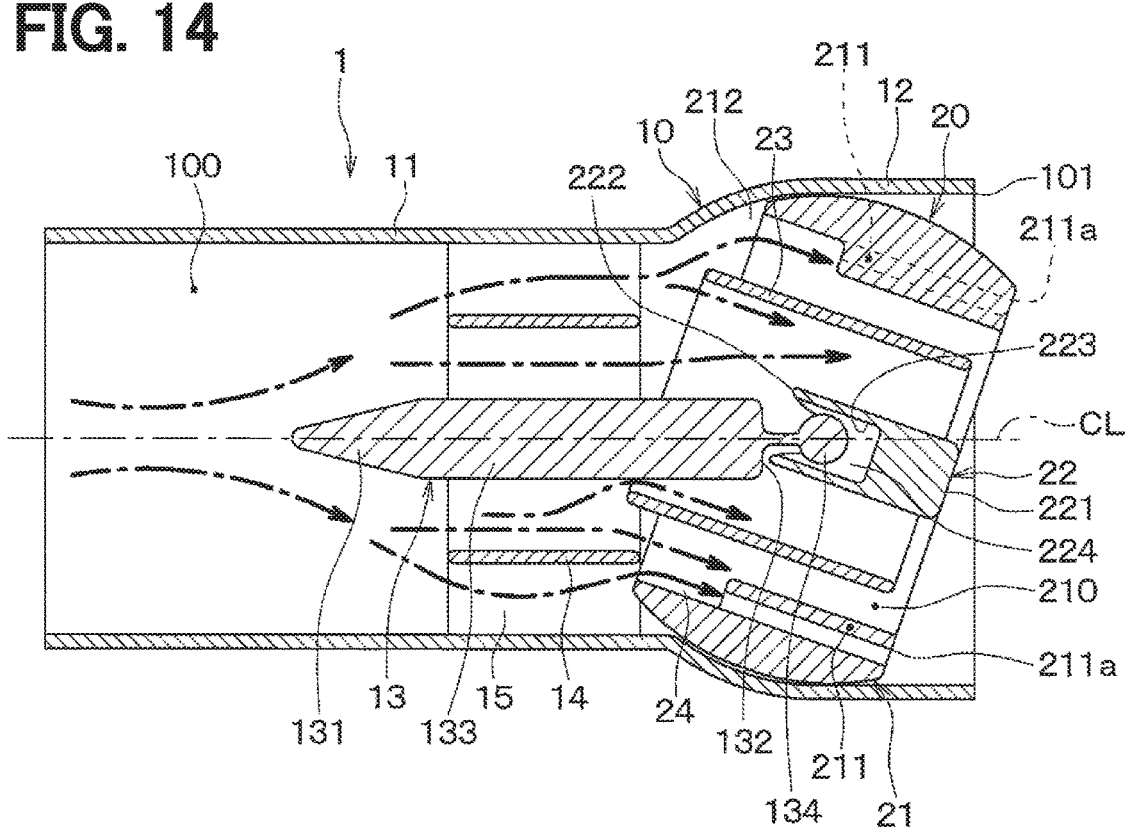
FIG. 14 is a diagram for explaining an air flow inside the fluid discharge device when the grill portion is directed downward.
Figure 15:
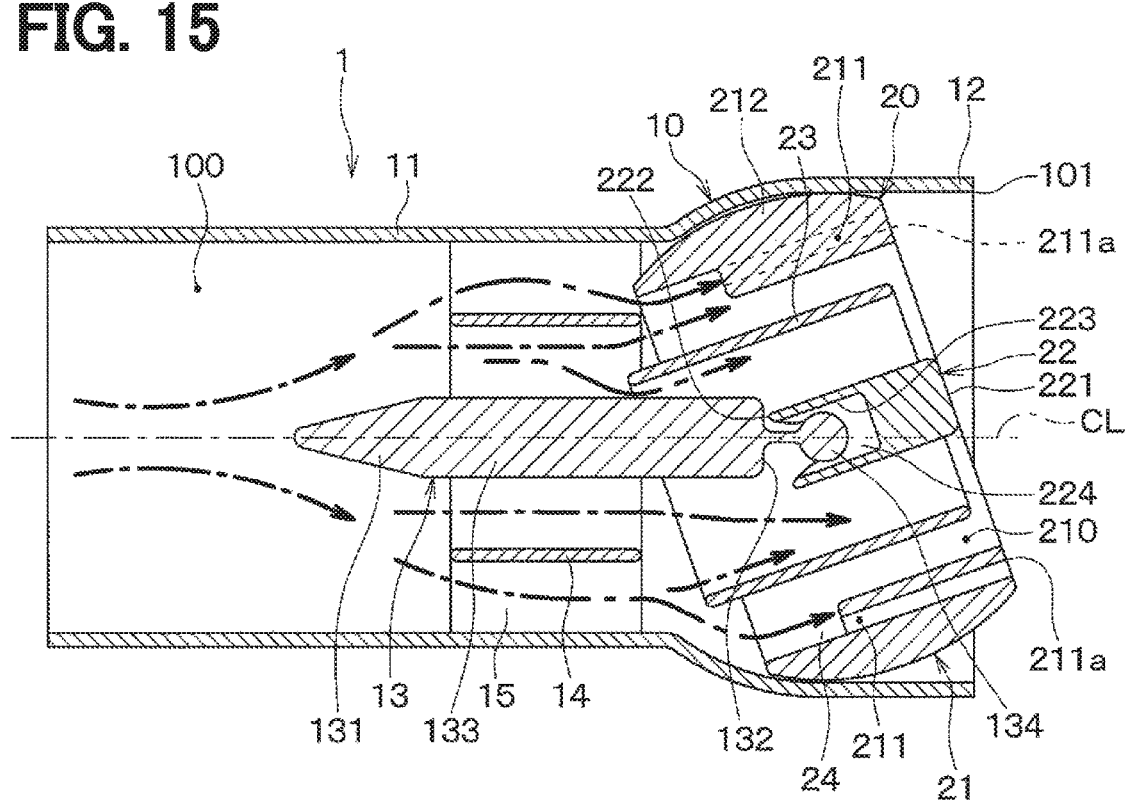
FIG. 15 is a diagram for explaining an air flow inside the fluid discharge device when the grill portion is directed upward.

FIG. 14 shows a state in which the grill portion 20 is set so that the airflow is blown downwardly from the opening 101. FIG. 15 shows a state in which the grill portion 20 is set so that the airflow is blown upwardly from the opening 101. As shown in FIG. 14, when the grill portion 20 is set so that the airflow is blown downwardly, the airflow flowing through the flow passage 100 flows through both the main flow passage 210 and the auxiliary flow passage 211. Therefore, the airflow is blown out from both the main flow passage 210 and the auxiliary flow passage 211.

Further, as shown in FIG. 15, even when the grill portion 20 is set so that the airflow is blown upwardly, the airflow flowing through the flow passage 100 flows through both the main flow passage 210 and the auxiliary flow passage 211, and is discharged from both the main flow passage 210 and the auxiliary flow passage 211.

Further, even when the grill portion 20 is set so that the airflow is blown in a left direction or a right direction, the airflow flowing through the flow passage 100 flows through both the main flow passage 210 and the auxiliary flow passage 211, and is discharged from both the main flow passage 210 and the auxiliary flow passage 211.

The fluid discharge device 1 described above is configured such that the grill portion 20 has a structure in which the auxiliary flow blown from the auxiliary flow passage 211 flows outside the main flow blown from the main flow passage 210. According to this, since the development of the lateral vortex Vt formed in the main flow can be suppressed by the auxiliary flow, it is possible to suppress the diffusion of the main flow and the suction of the external fluid outside the device into the main flow. As a result, the reaching distance of the main stream can be increased.

In addition, the fluid discharge device 1 is configured to change the direction of the auxiliary flow to be matched with the direction of the main flow when adjusting the direction of the air flow blown from the opening 101. According to this, even if the direction of the fluid blown out from the opening 101 is adjusted, the reaching distance of the main flow (mainstream) can be lengthened.

Thus, in the fluid discharge device 1, the tip end portion 131 of the center cone 13 provided in the base portion 10 functions as a dispersion portion that makes the direction of the airflow flowing from the flow passage 100 toward the main flow passage 210, to be changed to the side of the auxiliary flow passage 211. Further, the intermediate portion 133 of the center cone 13 functions as a contraction portion configured to reduce the passage sectional area of the fluid passage 100 as compared with an upstream side. Further, the base-side tubular portion 14 functions as a base-side regulator configured to regulate the fluid flowing through the flow passage 100 so as to cause the fluid to flow into both the main flow passage 210 and the auxiliary flow passage 211.

According to this, it is possible to prevent the airflow flowing in the flow passage 100 from being biased only in the main flow passage 210. That is, according to this configuration, the airflow flowing through the flow passage 100 easily flows not only into the main flow passage 210 but also into the auxiliary flow passage 211. Therefore, it is possible to sufficiently obtain the effect of suppressing the diffusion of the main flow by the auxiliary flow blown out from the auxiliary flow passage 211 and the effect of reducing the suction action of the external fluid.

Further, the fluid discharge device 1 is provided with a grill-side tubular portion 23 configured to rectify the main flow flowing through the main flow passage 210 with respect to the grill portion 20. Because the air flow rectified by the base-side tubular portion 14 is rectified again by the grill-side tubular portion 23, it is possible to prevent the air flow from being disturbed when the air flows into the main passage 210 from the flow passage 100. Suppressing the turbulence of the fluid in the main flow passage 210 is effective in increasing the reaching distance of the main flow blown out from the main flow passage 210.

Further, in the fluid discharge device 1, the grill portion 20 is rotatably supported with respect to the base portion 10 by a ball joint mechanism including the ball studs 134 and the ball sockets 224. According to this, since the grill portion 20 can be rotated in an arbitrary direction, the degree of freedom in adjusting the direction of the airflow blown from the opening 101 can be improved.

As described above, in the fluid discharge device 1 of the present embodiment, the suction action of the external fluid from outside of the device into the main flow can be reduced by the auxiliary flow. Therefore, if the fluid discharge device 1 of this embodiment is used as an air discharge device of the air conditioning unit ACU, it can restrict the temperature or humidity of the air adjusted by the air conditioning unit ACU from being changed by an un-adjusted air outside the device. In other words, according to the fluid discharge device 1 of the present embodiment, it becomes easier for the air having a temperature or humidity adjusted by the air conditioning unit ACU to reach a desired space while maintaining the adjusted temperature or humidity.

Second Embodiment

Next, a second embodiment will be described with reference to FIG. 16. In this embodiment, the shape of an opening 101 of a base portion 10 is different from that of the first embodiment. In the present embodiment, a difference part different from the first embodiment will be mainly described, and description for a part similar to the first embodiment will be omitted.

Figure 16:
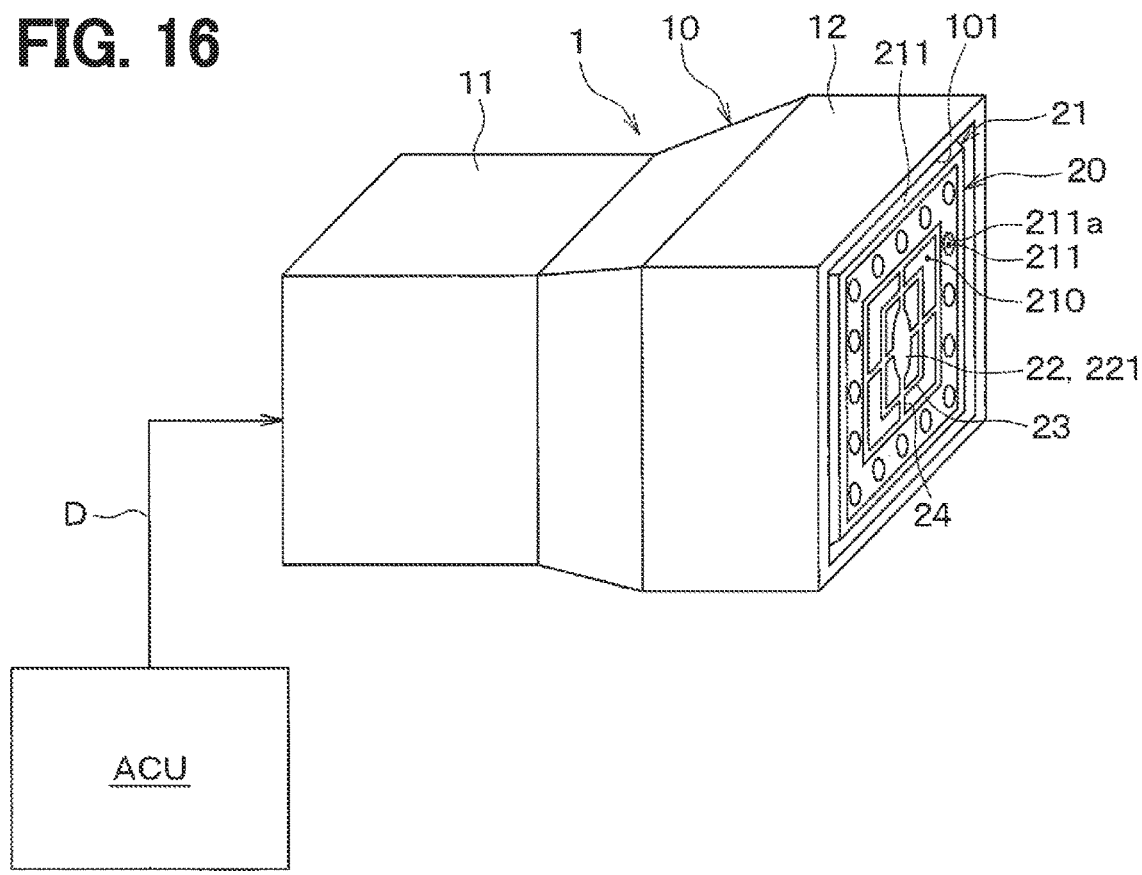
FIG. 16 is a schematic perspective view of a fluid discharge device according to a second embodiment.

As shown in FIG. 16, the base portion 10 is made of a substantially rectangular tubular member having a rectangular cross section, and a rectangular opening 101 is opened at an end on the air flow downstream side. Further, in the grill portion 20, the flow passage forming body 21 is configured by a tubular member having a substantially rectangular tubular shape.

The other configurations are the same as those of the first embodiment. In the fluid discharge device 1 of the present embodiment, the adjustment range of the direction of the airflow by the grill portion 20 is limited. However, even if the direction of the fluid blown out from the opening 101 is adjusted, it is possible to extend the reaching distance of the main flow similarly to the first embodiment.

Other Embodiments

The representative embodiments of the present disclosure have been described above. However, the present disclosure is not limited to the above-described embodiments, and may be variously modified as follows.

In the above-described embodiment, an example in which the center cone 13 and the base-side tubular portion 14 are provided in the base portion 10 has been described, but the present disclosure is not limited to this. The fluid discharge device 1 may have a configuration in which the center cone 13 and the base-side tubular portion 14 are not provided in the base portion 10, for example. The fluid discharge device 1 may have a configuration in which one of the center cone 13 or the base-side tubular portion 14 is provided in the base portion 10, for example.

The fluid discharge device 1 may have a configuration in which the center cone 13 is provided but the base-side tubular portion 14 is not provided in the base portion 10, for example. In this case, the center cone 13 may have a configuration in which, for example, the tip portion 131 functioning as a dispersion portion is provided but the intermediate portion 133 functioning as a contraction portion is omitted. Conversely, the center cone 13 may have a configuration in which, for example, the tip portion 131 functioning as a dispersion portion is omitted and the intermediate portion 133 functioning as a contraction portion is provided.

In the above-described embodiment, an example has been described in which the main flow passage 210 is formed by a space inside the outer wall portion 212 of the flow passage forming body 21, and the auxiliary flow passage 211 is formed by the through holes 211a penetrating through the outer wall portion 212; however, the present disclosure is not limited to this. The flow passage forming body 21 may be configured, for example, by arranging a plurality of cylindrical members defining the auxiliary flow passage 211 around a cylindrical member defining the main flow passage 210.

In the above-described embodiment, an example in which the grill-side tubular portion 23 is provided in the grill portion 20 has been described, but the present disclosure is not limited to this. For example, the fluid discharge device 1 may have a configuration in which the grill-side tubular portion 23 is not provided with respect to the grill portion 20.

In the above-described embodiment, an example in which the ball stud 134 is provided in the base portion 10 and the ball socket 224 is provided in the grill portion 20 has been described, but the present disclosure is not limited thereto. The fluid discharge device 1 may have a configuration in which one of the ball stud 134 and the ball socket 224 is provided in the grill portion 20 and the other one is provided in the base portion 10.

In the above-described embodiment, an example in which the grill portion 20 is rotatably supported with respect to the base portion 10 by the ball joint mechanism including the ball stud 134 and the ball socket 224 has been described, but the present disclosure is not limited thereto. The grill portion 20 may be configured to be supported with respect to the base portion 10 by a support mechanism other than the ball joint mechanism.

In the above-described embodiment, the air-conditioning unit ACU has been exemplified as an air conditioner for adjusting the temperature or humidity of the air introduced into the base portion 10, but the present disclosure is not limited thereto. The air conditioner may be made of, for example, a humidifier that humidifies the entire or part of the vehicle interior or a dehumidifier that dehumidifies the entire or part of the vehicle interior.

In the above-described embodiment, an example in which the air discharge device 1 of the present disclosure is applied to the air discharge device of an air conditioning unit for performing an air conditioning of a vehicle compartment is illustrated, but the present disclosure is not limited to this. The fluid discharge device 1 of the present disclosure can be applied to an air outlet device other than the air discharge device of the air conditioning unit ACU. Further, the fluid discharge device 1 of the present disclosure is also applicable to a device that discharges a gas or liquid other than air.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

(Overview)

According to a first aspect shown in part or all of the above-described embodiments, a fluid discharge device includes a base portion defining a fluid flow passage in which a fluid flows, and a grill portion configured to adjust a flow direction of the fluid blown from an opening of the fluid flow passage. The grill portion includes a flow passage forming body defining a main flow passage that guides a part of the fluid flowing through the fluid flow passage to the opening as a main flow, and an auxiliary flow passage that guides the rest part of the fluid flowing through the fluid flow passage to the opening as an auxiliary flow. The flow passage forming body is configured, so that the auxiliary flow passage surrounds the main flow passage and the auxiliary flow discharged from the auxiliary flow passage flows outside of the main flow discharged from the main flow passage. The flow passage forming body is configured such that a direction of the auxiliary flow discharged from the auxiliary flow passage corresponds to the direction of the main flow discharged from the main flow passage, when the flow direction of the fluid blown out of the opening is adjusted.

According to a second aspect, the base portion of the fluid discharge device includes a dispersion portion disposed at an upstream side of the grill portion in the flow direction of the fluid, the dispersion portion being configured to make the direction of the fluid flowing from the flow passage toward the main flow passage, to be changed to a side of the auxiliary flow passage.

In the fluid flow passage, a flow rate near a wall surface tends to be smaller than the flow rate near a center because the velocity of the fluid decreases near the wall surface. If the auxiliary flow passage is formed outside the main flow passage as in the fluid discharge device of the present disclosure, it may become difficult for the fluid to flow in the auxiliary flow passage as compared with the main flow passage. If the flow rate of the fluid flowing through the auxiliary flow passage is small, it may be difficult to sufficiently obtain the effect of suppressing the diffusion of the main flow due to the auxiliary flow discharged from the auxiliary flow passage and to obtain the effect of reducing a suction action of an external fluid.

If the flow passage formed in the base portion is provided with the dispersion portion, a part of the fluid flowing toward the main flow passage in the fluid flow passage can easily flow toward the auxiliary flow passage by the dispersion portion. Therefore, it is possible to sufficiently obtain the effect of reducing the suction action of the external fluid, by the auxiliary flow blown out from the auxiliary flow passage.

According to a third aspect, the base portion of the fluid discharge device includes a flow contraction portion configured to reduce a passage cross-sectional area of the flow passage at an upstream side of the fluid flow with respect to the grill portion. In this way, if the fluid flow passage formed in the base portion is provided with the flow contraction portion that reduces the cross-sectional area of the fluid flow passage, a velocity difference between the vicinity of the wall surface and the vicinity of the center of the fluid flow passage becomes small, and the fluid flowing through the fluid flow passage becomes easy to flow to the auxiliary flow passage. Therefore, it is possible to sufficiently obtain the effect of reducing the suction action of drawing the external fluid by using the auxiliary flow blown out from the auxiliary flow passage.

According to a fourth aspect, the base portion of the fluid discharge device has a base-side rectifying portion disposed at an upstream side of the grill portion to rectify the fluid flowing through the fluid flow passage and to cause the fluid flowing through the fluid flow passage to flow through both the main flow passage and the auxiliary flow passage. In this way, if the base-side rectifying portion is provided in the fluid flow passage provided in the base portion, the fluid flowing through the fluid flow passage can easily flow toward the auxiliary flow passage. Therefore, it is possible to sufficiently obtain the effect of reducing the suction action of drawing the external fluid by using the auxiliary flow blown out from the auxiliary flow passage.

According to a fifth aspect, the grill portion of the fluid discharge device is provided with a grill-side rectifying portion configured to rectify the fluid flowing through the main flow passage. According to this, if the grill-side rectifying portion is provided for the flow passage forming body, a turbulence of the fluid in the main flow passage is suppressed, and the fluid can be appropriately blown from the main flow passage.

According to a sixth aspect, the base portion of the fluid discharge device includes a dispersion portion configured to make the direction of the fluid flowing from the fluid flow passage toward the main flow passage to be changed to a side of the auxiliary flow passage, and a contraction portion configured to reduce a passage cross-sectional area of the fluid flow passage at a downstream side of the fluid flow of the dispersion portion. Further, the base portion is provided with a base-side rectifying portion configured to rectify the fluid flowing through the fluid flow passage such that the fluid flowing through the fluid flow passage passes through both the main flow passage and the auxiliary flow passage.

According to this, a part of the fluid flowing toward the main flow passage in the fluid flow passage easily flows to the auxiliary flow passage by the dispersion portion. In addition, the fluid velocity difference between the vicinity of the wall surface and the vicinity of the center of the flow passage becomes smaller by the contraction portion located at the downstream side of the dispersion portion. Further, a turbulent fluid flow that is disturbed by the dispersion portion and the contraction portion is rectified by the base-side rectifying portion so as to flow into both the main flow passage and the auxiliary flow passage. In this way, if the dispersion portion, the contraction portion, and the base-side rectifying portion are provided in the fluid flow passage, it is possible to prevent the fluid flowing through the fluid flow passage from flowing unevenly only into the main flow path. That is, according to this configuration, because the fluid flowing through the fluid flow passage easily flows not only to the main flow passage but also to the auxiliary flow passage, it is possible to effectively obtain the effect of suppressing the diffusion of the main stream due to the auxiliary flow blown out from the auxiliary flow passage and the effect of reducing the suction of the external fluid.

According to a seventh aspect, the base-side rectifying portion of the fluid discharge device is provided at an upstream side of the fluid flow in the main flow passage. The grill portion is provided with a grill-side rectifying portion configured to rectify the fluid flowing through the main flow passage provided at the downstream side of the fluid flow of the base-side rectifying portion. Because the fluid rectified by the base-side rectifying portion is rectified by the grill-side rectifying portion, it is possible to prevent the fluid from being disturbed when the fluid flows into the main passage from the fluid flow passage. Suppressing the turbulence of the fluid in the main flow passage is effective in increasing the reaching distance of the main flow blown out from the main flow passage.

According to an eighth aspect, in the base portion of the fluid discharge device, a part of an inner wall surface of an accommodation portion accommodating the grill portion is curved so that the grill portion is rotatable therein. The flow passage forming body has an annular outer wall portion that is curved corresponding to the inner wall surface of the accommodation portion, a main flow passage provided inside the outer wall portion and a plurality through holes penetrating through the outer wall portion as an auxiliary flow passage along a direction parallel to the main flow passage.

In this way, if the main flow passage is formed inside the outer wall portion of the flow passage forming body and the auxiliary flow passage is formed by the through holes penetrating through the outer wall portion, it is possible to align the direction of the auxiliary flow blown out from the auxiliary flow passage with the direction of the main flow blown out from the main flow passage while the auxiliary flow passage surrounds the main flow passage.

According to a ninth aspect, the fluid discharge device includes a support mechanism configured to rotatably support the grill portion with respect to the base portion. The support mechanism is configured by a ball joint mechanism including a spherical ball stud provided at one of the grill portion and the base portion, and a ball socket provided at the other one of the grill portion and the base portion to receive the ball stud.

In this way, if the grill portion is supported by the ball joint mechanism with respect to the base portion, the grill portion can be rotated in any direction, so that the degree of freedom in adjusting the direction of the fluid blown out from the opening is increased.

According to a tenth aspect, the base portion of the fluid discharge device is connected to an air conditioner configured to adjust the temperature or humidity of the air at an upstream side of the air flow so that conditioned air as a fluid having an adjusted temperature or humidity flows into the fluid flow passage.

As described above, in the fluid discharge device of the present embodiment, the suction action of the external fluid from outside of the device into the main flow can be reduced by the auxiliary flow. Therefore, if the fluid discharge device of the present disclosure is used as an air discharge device of an air conditioner, it can restrict the temperature or humidity of the conditioned air adjusted by the air conditioner from being changed by an outside air outside the device, which are not adjusted in the temperature or humidity. In other words, according to the fluid discharge device of the present disclosure, it becomes easier for the air having a temperature or humidity adjusted by the air conditioner to reach a desired space while maintaining the adjusted temperature or humidity.

What is claimed is:

1. A fluid discharge device for discharging a fluid comprising:
   a base portion defining a fluid flow passage and having an opening at a downstream end of the fluid flow passage;
   a grill portion disposed in the fluid flow passage to adjust a flow direction of the fluid blown from the opening; and
   a dispersion portion disposed at an upstream side of the grill portion in the flow direction of the fluid, wherein
   the grill portion includes a flow passage forming body defining a main flow passage that guides a part of the fluid flowing through the fluid flow passage to the opening as a main flow, and an auxiliary flow passage that guides the rest part of the fluid flowing through the fluid flow passage to the opening as an auxiliary flow,
   the auxiliary flow passage surrounds the main flow passage and the auxiliary flow discharged from the auxiliary flow passage flows outside of the main flow discharged from the main flow passage,
   a direction of the auxiliary flow discharged from the auxiliary flow passage corresponds to a direction of the main flow discharged from the main flow passage, when a flow direction of the fluid blown out of the opening is adjusted, and
   the dispersion has a tip portion tapered as toward upstream and configured to cause the flow direction of the fluid flowing from the fluid flow passage to flow toward the main flow passage and the auxillary flow passage, and the fluid flowing in the main flow passage to flow into the auxillary flow passage.

2. The fluid discharge device according to claim 1, further comprising
   a contraction portion disposed in the base portion at an upstream side of the grill portion in the flow direction of the fluid, to reduce a passage cross-sectional area of the fluid flow passage.

3. The fluid discharge device according to claim 1, further comprising a base-side rectifying portion disposed in the base portion at an upstream side of the grill portion in the flow direction of the fluid to rectify the fluid flowing in the fluid flow passage so that the fluid flowing in the fluid flow passage flows into both the main flow passage and the auxiliary flow passage.

4. The fluid discharge device according to claim 1, further comprising
a grill-side rectifying portion disposed in the grill portion to rectify the fluid flowing through the main flow passage.

5. The fluid discharge device according to claim 1, further comprising:
the dispersion portion is disposed in the base portion to cause the flow direction of the fluid flowing from the fluid flow passage toward the main flow passage, to be changed to a side of the auxiliary flow passage,
a contraction portion disposed in the base portion at a downstream side of the dispersion portion, to reduce a passage cross-sectional area of the fluid flow passage, and
a base-side rectifying unit disposed in the base portion to rectify the fluid flowing through the fluid flow passage such that the fluid flowing through the fluid flow passage flows through both the main flow passage and the auxiliary flow passage.

6. The fluid discharge device according to claim 5, wherein
the base-side rectifying portion is provided in an upstream area of the fluid flow in the main flow passage, and
a grill-side rectifying portion is disposed in the grill portion at a downstream side of the base-side rectifying portion to rectify the fluid flowing through the main flow passage.

7. The fluid discharge device according to claim 1, wherein
the base portion includes an accommodation portion in which the grill portion is accommodated, a part of an inner wall surface of the accommodation portion is curved to cause the grill portion to be rotatable in the accommodation portion, and
the flow passage forming body has an annular outer wall portion that is curved corresponding to the inner wall surface of the accommodation portion, the main flow passage is provided inside the outer wall portion, and the auxiliary flow passage is provided by a plurality of through holes penetrating through the outer wall portion along a direction parallel with main flow passage.

8. The fluid discharge device according to claim 1, further comprising
a support mechanism configured to rotatably support the grille portion with respect to the base portion, wherein
the support mechanism is made of a ball joint mechanism that includes a spherical ball stud provided at one of the grill portion and the base portion, and a ball socket provided at the other one of the grill portion and the base portion to receive the ball stud.

9. The fluid discharge device according to claim 1, wherein
the base portion is connected to an air conditioner configured to adjust a temperature or a humidity of air as the fluid at an upstream air side so that conditioned air having an adjusted temperature or humidity flows to the fluid flow passage.

10. The fluid discharge device according to claim 1, further comprising
a rod-shaped column portion arranged inside of the flow passage forming body to rotatably support the grill portion, wherein
an axis of the column portion is substantially aligned with a center line of the main flow passage.

11. The fluid discharge device according to claim 1, further comprising
a cylindrical member disposed in the base portion at an upstream side of the grill portion, wherein
the dispersion portion is a center cone disposed in the base portion at a center area of the fluid flow passage to extend in the flow direction of the fluid in the cylindrical member, and
the tip portion is tapered as toward upstream and protrudes upstream from the cylindrical member.

12. A fluid discharge device for discharging a fluid, comprising:
a casing defining a fluid flow passage and having an opening at a downstream end of the fluid flow passage;
a rotatable member rotatable in the casing to adjust a flow direction of the fluid blown from the opening;
a first cylindrical member disposed in the casing, and a second cylindrical member disposed in the rotatable member at a downstream side of the first cylindrical member; and
a center cone disposed in the casing at a center area of the fluid flow passage to extend in the flow direction of the fluid within the first cylindrical member and the second cylindrical member, wherein
the rotatable member is disposed to define a main flow passage that guides a part of the fluid flowing through the fluid flow passage to the opening as a main flow, and an auxiliary flow passage that guides the rest part of the fluid flowing through the fluid flow passage to the opening as an auxiliary flow,
the auxiliary flow passage surrounds the main flow passage and the auxiliary flow discharged from the auxiliary flow passage flows outside of the main flow discharged from the main flow passage,
a direction of the auxiliary flow discharged from the auxiliary flow passage corresponds to a direction of the main flow discharged from the main flow passage, when the flow direction of the fluid blown out of the opening is adjusted by the rotatable member, and
the center cone has a tip portion tapered as toward upstream and protruding upstream from the first cylindrical member.

13. The fluid discharge device according to claim 12, wherein
the rotatable member has a plurality of through holes extending in a direction parallel to the main flow flowing in the second cylindrical portion, and
the auxiliary flow passage is defined by the through holes.

* * * * *